(12) United States Patent
Judson

(10) Patent No.: US 6,599,053 B1
(45) Date of Patent: Jul. 29, 2003

(54) BUSHING AND TOOTHED WHEEL ASSEMBLY WITH PREFERRED ROTATION

(75) Inventor: Garold Martin Judson, Sprague, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/018,632

(22) PCT Filed: Jul. 15, 1999

(86) PCT No.: PCT/US99/16046
§ 371 (c)(1),
(2), (4) Date: Dec. 18, 2001

(87) PCT Pub. No.: WO01/06141
PCT Pub. Date: Jan. 25, 2001

(51) Int. Cl.⁷ .............................................. F16H 55/48
(52) U.S. Cl. ..................... 403/368; 403/374.3; 403/338
(58) Field of Search ............................ 403/373, 374.1, 403/374.2, 374.3, 374.4, 367, 366, 368, 338, 335

(56) References Cited

U.S. PATENT DOCUMENTS

| | | |
|---|---|---|
| 2,402,743 A | 6/1946 | Firth |
| 2,763,158 A | 9/1956 | Firth |
| 3,677,583 A | 7/1972 | Steinke |
| 3,682,505 A | 8/1972 | Firth |
| 3,851,977 A | 12/1974 | Boole |
| 4,338,036 A | 7/1982 | DeLeu |
| 4,421,498 A * | 12/1983 | DeLeu et al. ................ 474/182 |
| 4,471,846 A | 9/1984 | Mullenberg |
| 4,494,889 A | 1/1985 | Thompson |
| 4,620,814 A | 11/1986 | May |
| 4,624,597 A | 11/1986 | Johnson et al. |
| 4,781,661 A * | 11/1988 | Emmett ....................... 474/190 |
| 5,304,101 A * | 4/1994 | Baer ........................... 474/170 |

FOREIGN PATENT DOCUMENTS

DE             2027871        12/1970

* cited by examiner

Primary Examiner—Lynne H. Browne
Assistant Examiner—John R. Cottingham
(74) Attorney, Agent, or Firm—Nancy T. Krawczyk

(57) ABSTRACT

An assembly (10) of a tapered bushing (14) and a toothed wheel (12), having a preferred direction of rotation. The assembly (10) having on each face (22, 24) a hole or set of holes $H_1$, $H_2$ containing surfaces which interact with a threaded rod (26) for mating and/or separating of the assembly (10) form either face (22, 24). In a preferred embodiment of the invention, the assembly (10) will have two mating holes and one separation hole on each face (22, 24) of the assembly (10). This assembly (10) allows ease of mating and/or separating the assembly when access is limited to only one face of the assembly.

8 Claims, 4 Drawing Sheets

BUSHING AND TOOTHED WHEEL ASSEMBLY WITH PREFERRED ROTATION

Technical Field

This invention relates to an assembly consisting of a tapered bushing and a toothed wheel, with a preferred direction of rotation. More particularly, this invention relates to an assembly, which allows the bushing and the toothed wheel to be mated together, or separated, using a threaded rod inserted and tightened from either side of the assembly.

BACKGROUND ART

Assemblies using conventional tapered bushings to fasten pulleys, sheaves, or gears to hafts are widely used. Tapered bushings use less space on an axial shaft than other types of bushings and are favored for this reason. For example, the QD bushing and wheel assembly requires additional axial space due to the flange area of the bushing that protrudes from the ace of the wheel.

Assemblies using tapered bushings have a female mating surface on the wheel and a male mating surface on the bushing. The tapered bushing is axially split and contractible about the shaft which it receives. As the male mating surface of the bushing is mated with the female mating surface of the wheel, the bushing contracts around the shaft. Thus, by mating the bushing and the wheel, the bushing becomes affixed to the shaft and the wheel affixed to the bushing. However, difficulty is often encountered in the process of mating the bushing and the wheel, and in separating the bushing from the wheel once mated.

Prior art improvements to these assemblies have focused on designs that aid in mating or separating the bushing and the wheel. In U.S. Pat. No. 2,402,743 entitled "MOUNTING FOR SHEAVES, ETC.", granted Jun. 7, 1944, the inventor used a plurality of screws parallel with the hub axis for effecting wedging of the bushing between the hub and the shaft. As the screws are tightened sufficiently their heads abut against the bushing shoulders and further entry of the screws into the hub wedges the bushing between the hub and the shaft. However, in this invention the screws are only inserted from one side of the assembly.

As the use of the invention of U.S. Pat. 2,402,743 became more widespread, difficulties arose when the assembly was to be mounted in close proximity to another item, such as a drive motor or another bushing wheel assembly. This problem became more apparent to the inventor with the use of assemblies with toothed wheels having a preferred direction of rotation, such as assemblies for use with the Eagle PD™ belt described in U.S. Pat. 5,209,705. When affixing these assemblies to a shaft to rotate in the preferred direction, the face of the assembly containing the screws may be in close proximity to another containing the screws may be in close proximity to another item. This results in great difficulty in tightening the screws.

U.S. Pat. No. 3,682,505 entitled "MEANS FOR MOUNTING SHEAVES, ETC.," granted Aug. 8, 1972, describes an attempt to overcome this problem. With the mounted sheave system disclosed in this patent, a plurality of longitudinal bores are formed in the assembly. Each bore is aligned and in communication with a screw hole. Each screw for use in the assembly includes a socket or slotted portion at the end for engaging a driving tool which can be inserted into either the bore or the hole to tighten the screw from either side of the assembly. A disadvantageous limitation of this system is that the bolts can only be inserted from one face of the assembly. Access to insert or remove these bolts may be limited when the face of the assembly containing the holes is placed in close proximity to another item.

U.S. Pat. 2,763,158 and 3,851,977 also describe similar bushing and sheaves.

DISCLOSURE OF INVENTION

The toothed wheel and tapered bushing assembly of the invention addresses the problem of the prior art that occurs when the prior art assembly is mounted in close proximity to another item. Since access to the screws, used to mate or separate the bushing and the wheel, may be limited, this invention allows the screws, or threaded rods, to be inserted and tightened from either face of the assembly. This invention allows assembly inventories to be half that needed in the past because the assembly can be used regardless of which side of the assembly is in close proximity to the other item.

This invention relates to an assembly 10 of a toothed wheel 12 and a tapered bushing 14. The toothed wheel 12 has a tapered hole 16 forming at least one tapered surface 18 in the wheel 12. The tapered hole 16 also forms a first and a second opening, the first opening $W_1$ being larger than the second opening $W_2$. The tapered bushing 14 has at least one tapered surface 20. The bushing tapered surface 20 is capable of mating relationship with the wheel tapered surface 18. The assembly 10 has a first face 22 and a second face 24 spaced apart from one another along an axis. When the tapered surfaces of the bushing 14 and the wheel 12 are in mated relationship, the first opening $W_1$ of the wheel hole 16 is in proximity to the first face 22 of the assembly 10 and the second opening $W_2$ of the wheel hole 16 is in proximity to the second face 24 of the assembly 10. The assembly 10 also has a first hole or set of holes $H_1$, respectively, for receiving a threaded rod 26. This hole or set; of holes $H_1$ extends at least partially along the mating surfaces from the first face 22 of the assembly 10 toward the second face 24 of the assembly 10. The holes $H_1$ are formed in part by a groove 28 located in the toothed wheel 12 and in part by a groove 30 located in the bushing 14.

The toothed wheel 12 in the assembly of the invention has a preferred direction of rotation about its axis. The assembly 10 also has a second hole or set of holes $H_2$, respectively, for receiving a threaded rod 26. These holes $H_2$ extend at least partially along the mating surfaces from the second face 24 of the assembly 10 toward the first face 22 of the assembly 10. The holes $H_2$ are formed in part by a groove 32 located in the toothed wheel 12 and in part by a groove 34 located in the bushing 14. The threaded rod 26 is able to interact with surfaces in or adjacent to the wheel and the bushing grooves of each hole. This interaction can cause the toothed wheel 12 and the bushing 14 to be moved in an axial direction with respect to each other when the threaded rod 26 is threaded into either the first or second hole or sets of holes and is tightened.

DEFINITIONS

For ease of understanding this disclosure, the following terms are disclosed.

"Axial" or "axially" means the lines or directions that are parallel to the axis of rotation of the toothed wheel and bushing assembly 10.

"Taper" or "tapered" means that an item gradually narrows toward one end.

BRIEF DESCRIPTION OF DRAWINGS

FIG. 7 shows a threaded rod 26 with a head 36 shouldered upon the surface adjacent one groove and in threaded connection with the surface of the other groove where the threaded groove also contains an open cavity 38 immediately below the threaded rod head 36.

DETAILED DESCRIPTION OF THE INVENTION

Figure 1:
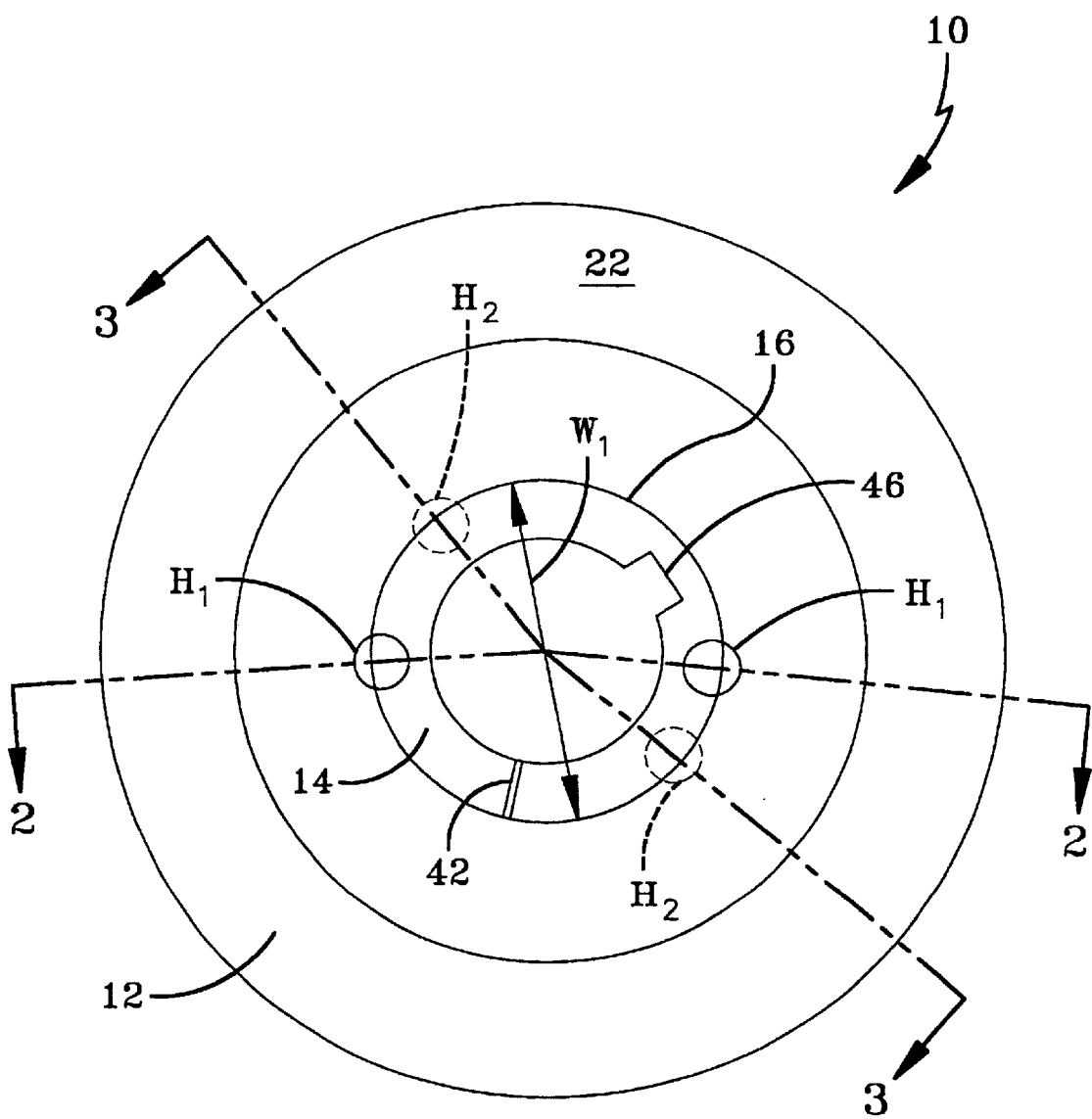
FIG. 1 is a view from the first face 22 of an assembly 10 embodying the invention and having a set of two holes $H_1$ on the first face 22 and a set of two holes $H_2$ on a second face 24.

FIG. 1 shows a view of a mated assembly 10 of a tapered bushing 14 and a toothed wheel 12, having a preferred direction of rotation about an axis, in mated relationship with one another. This assembly 10 is viewed from the first face 22 which contains the larger opening $W_1$ of the tapered hole 16 in the toothed wheel 12 and the wider end of the tapered bushing 14. The tapered bushing 14 contains a split 42 which is contractible around an inserted axial shaft 44. The bushing 14 may contain a keyway 46 for locking the bushing 14 onto the shaft 44. The first face 22 of the assembly 10 contains a hole or set of holes $H_1$, shown as two holes in FIG. 1, which extend at least partially along the mating surfaces of the toothed wheel 12 and the tapered bushing 14 from the first face 22 of the assembly 10 toward the second face 24 of the assembly 10. Each of these holes $H_1$ is formed in part by a groove 28 located in the toothed wheel 12 and in part by a groove 30 located in the bushing 14. The assembly 10 also has a second hole or set of holes $H_2$, represented by two holes in FIG. 1, which extend at least partially along the mating surfaces of the toothed wheel 12 and the tapered bushing 14 from the second face 24 of the assembly 10 toward the first face 22 of the assembly 10. These holes $H_2$ are formed in part by a groove 32 located in the toothed wheel 12 and in part by a groove 34 located in the bushing 14. Each of the holes of the first and second sets contain surfaces in or adjacent to the wheel and the bushing grooves. When interacted with by a threaded rod 26, these surfaces allow the bushing 14 and toothed wheel 12 to be moved in an axial direction which respect to one another. Since the assembly 10 contains a hole or set of holes on both the first face 22 and the second face 24, the threaded rod 26 can be inserted and tightened from either face of the assembly 10.

In a preferred embodiment of the invention, each face of the assembly 10 will contain three holes, two for mating the bushing 14 and the wheel 12 and one for separating the bushing 14 from the wheel 12. This embodiment allows the assembly 10 to be both mated together and separated with access to only one of the two faces.

Figure 2:
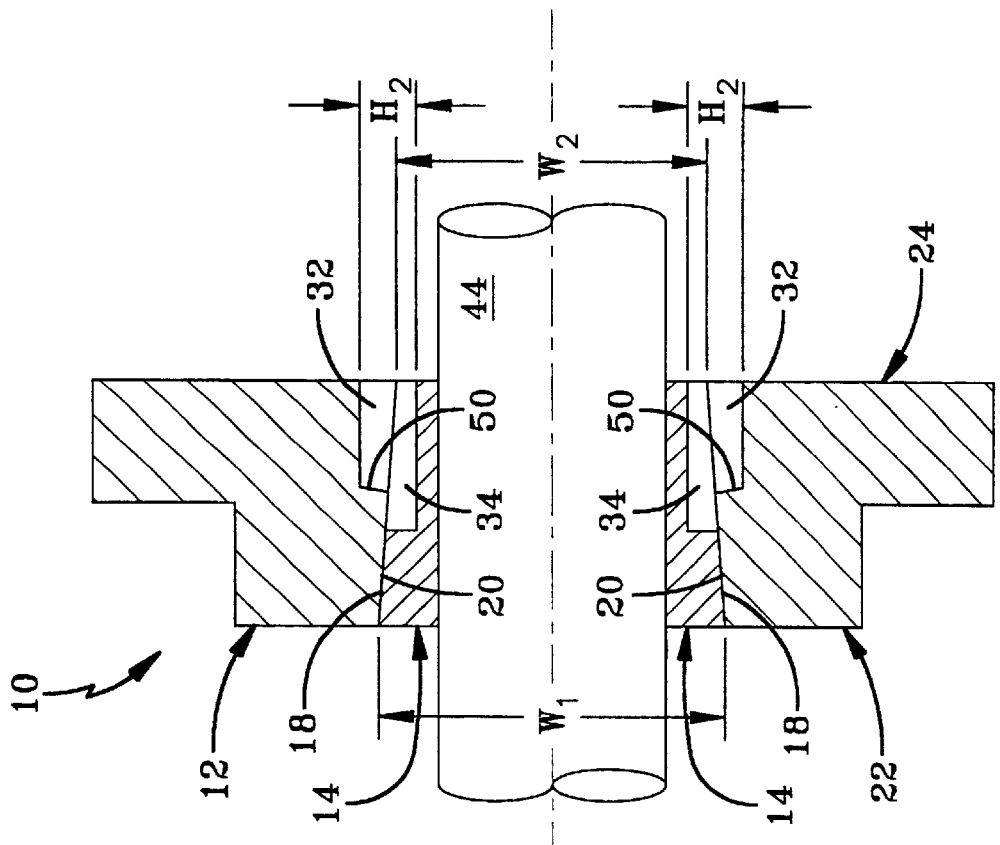
FIG. 2 is a longitudinal section of the assembly 10 taken on the line 2—2 of FIG. 1.

FIG. 2 shows a longitudinal view of the assembly 10, taken along line 2—2 of FIG. 1, with the bushing 14 and the wheel 12 mated together. The view shows the first set of holes $H_1$, represented by two holes, on the first face 22 of the assembly 10. The holes $H_1$ are formed, respectively, by aligning a groove 28 in the toothed wheel 12 and a groove 30 in the tapered bushing 14. The holes $H_1$ shown are for mating the bushing 14 and the toothed wheel 12. In each hole $H_1$, a blind half-hole is formed by a surface 48 in the groove 30 of the bushing 14. Each toothed wheel groove 28 extends at least as far along the mating surfaces as the blind half-hole; however, the toothed wheel groove 28 may extend beyond the blind half-hole and may even extend completely through the assembly 10.

Figure 3:
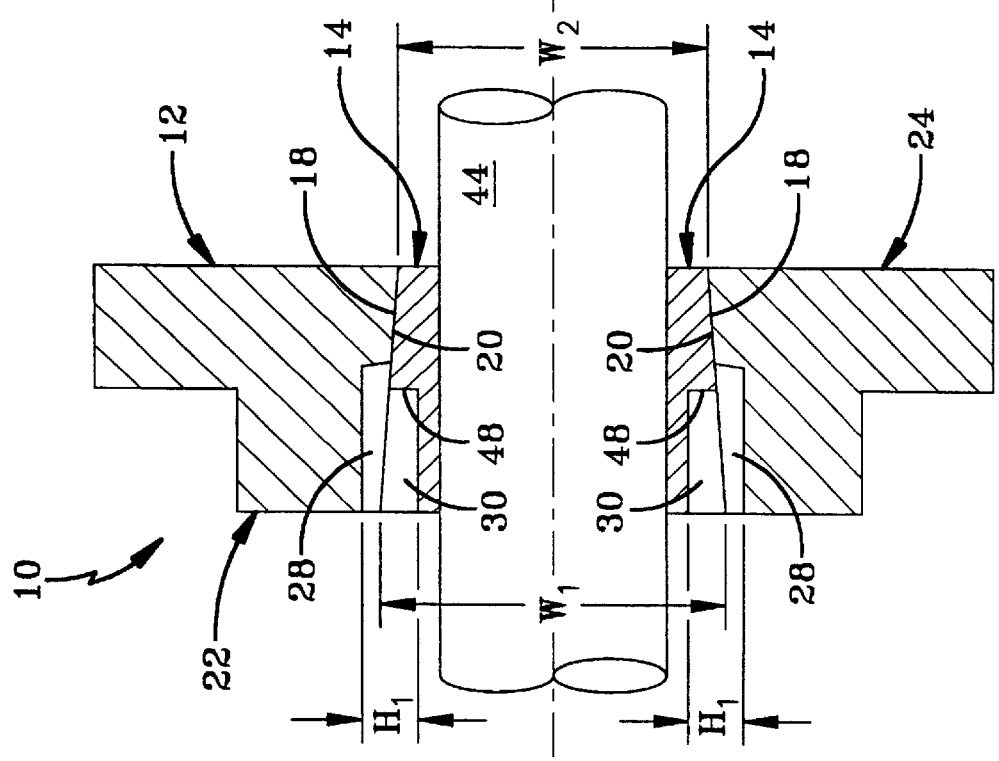
FIG. 3 is a longitudinal section of the assembly 10 taken on the line 3—3 of FIG. 1.

FIG. 3 shows a longitudinal view of the assembly 10, taken along line 3—3 of FIG. 1, with the bushing 14 and the wheel 12 mated together. This view shows the second set of holes $H_2$, represented by two holes, on the second face 24 of the assembly 10. The holes $H_2$ are formed, respectively, by aligning a groove 32 in the toothed wheel 12 and a groove 34 in the tapered bushing 14. The holes $H_2$ are for mating the bushing 14 and the toothed wheel 12. In each hole $H_2$, a blind half-hole is formed by a surface 50 in the groove 32 of the toothed wheel 12. Each bushing groove 34 extends at least as far along the mating surfaces as the blind half-hole; however, the bushing groove 34 may extend beyond the blind half-hole and may even extend completely through the assembly 10.

Figure 4:
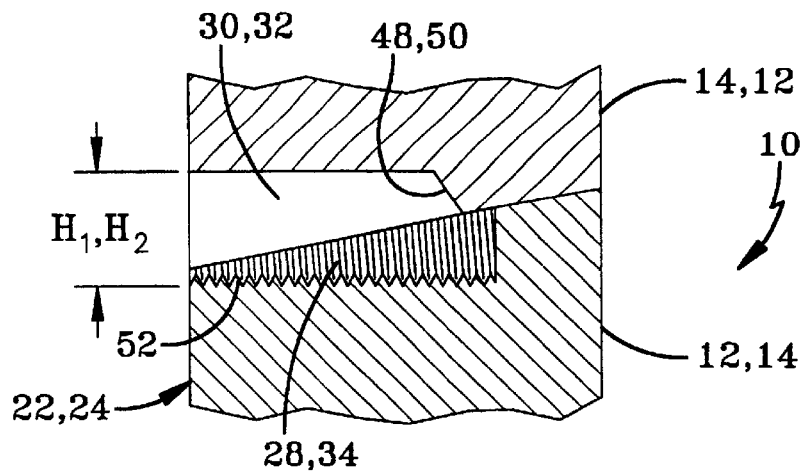
FIG. 4 is a detailed view of one of the holes of the assembly 10 formed in part by a bushing groove and in part by a wheel groove.

FIG. 4 shows a detailed view of a hole $H_1$, $H_2$ formed in part by a bushing groove 30,34 and in part by a toothed wheel groove 28, 32. Each groove contains surfaces which can interact with a threaded rod. The figure shows a groove shorter in length than the other groove, which ends in a surface 48, 50 forming a blind half-hole. The other groove, at least as long or longer in length than the groove containing the half-blind hole, is threaded 52 to receive a threaded rod 26. FIG. 4 can represent mating holes on either the first 22 or the second 24 face of the assembly 10. If FIG. 4 represents a mating hole on the first face 22 of the assembly 10, the groove containing the surface 48 which forms the blind half-hole is a bushing groove 30 and the groove which contains the threads 52 is a toothed wheel groove 28. Conversely, if FIG. 4 represents a mating hole on the second face 24 of the assembly 10, the groove containing the surface 50 which forms the blind half-hole is a toothed wheel groove 32 and the groove containing the threads 52 is a bushing groove 34. The grooves of the hole used to separate the bushing from the toothed wheel will be exactly opposite those used in mating the bushing 14 and the toothed wheel 12. A separating hole on the first face 22 of the assembly 10 will be formed by a toothed wheel groove containing a surface forming a blind half-hole and a bushing groove containing threads, for threaded connection with a threaded rod 26. A separation hole on the second face 24 of the assembly 10 will be formed by a bushing groove containing a surface forming blind half-hole and a toothed wheel groove containing threads. Although the hole shown is parallel to the axis of rotation, the hole can also be formed at an angle along the mating surfaces.

Figure 5:
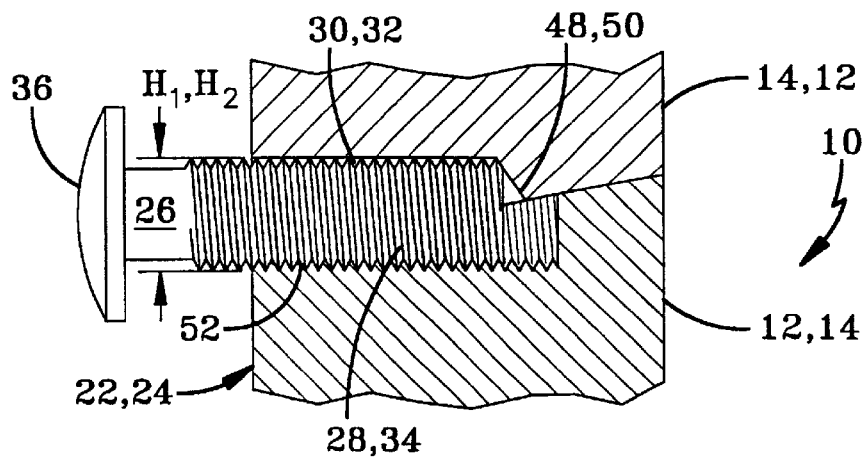
FIG. 5 is a detailed view of an embodiment of the invention where the threaded rod 26 is in threaded connection with the surface of one groove and where the bottom of the threaded rod 26 pushes on the surface forming a blind half-hole in the other groove.

FIG. 5 shows a threaded rod 26 inserted into a mating hole, either on the first face 22 or on the second face 24 of the assembly 10. If the mating hole is the first hole or set of holes $H_1$ on the first face 22 of the assembly 10, then the threaded rod 26 is in threaded connection with the threads 52 located in the toothed wheel groove 28. The bottom of the threaded rod 26 is forced against the surface 48 forming the blind half-hole in the bushing groove 30. As the threaded rod 26 is tightened, the bushing 14 is forced into mated relationship with the toothed wheel 12. If the mating hole of FIG. 5 depicts the second hole or set of holes $H_2$ contained on the second face 24 of the assembly 10, then the threaded rod 26 is in threaded connection with the threads 52 located in the bushing groove 34. The end of the threaded rod 26 is forced against the surface 50 forming the blind half-hole in the toothed wheel groove 32. As the threaded rod 26 is tightened, the toothed wheel 12 is forced into mated relationship with the tapered bushing 14. Although FIG. 5 depicts a threaded rod having a head, other variations of threaded rods are sufficient for this embodiment.

Figure 6:
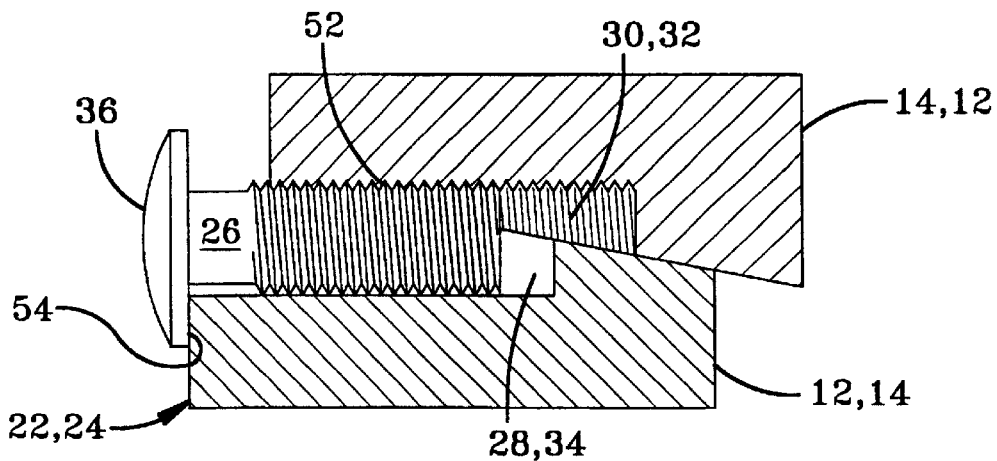
FIG. 6 is a detailed view of an embodiment of the invention where the threaded rod 26 with a head 36 is shouldered on the surface adjacent one groove and is in threaded connection with the surface of the other groove.

FIG. 6 shows another embodiment of the invention. FIG. 6 shows mating holes on either the first face 22 or the second face 24 of the assembly 10. This embodiment requires the use of a threaded rod 26 having a head 36. The hole is formed by the bushing groove 30, 34 and the toothed wheel groove 28, 32 becoming aligned. One of the grooves having a shoulder 54 adjacent the groove on the face 22, 24 of the assembly 10. The other groove containing is threads 52, to receive a threaded rod 26. The head 36 of the threaded rod 26 is forced against the shoulder 54 of the groove containing the shoulder. The threads of the threaded rod 26 are in threaded connection with the threads 52 of the groove containing the threads. As the threaded rod 26 is tightened, the threads 52 pull the part of the assembly 10 having the threads in the grooves toward the head 36 of the threaded rod 26 and into mated relationship with the other part of the assembly 10. With this embodiment of the invention, the head 36 of the threaded rod 26 can be shouldered upon either an area adjacent the bushing groove 34 or the toothed wheel groove 28, with the opposite groove containing the threads 52.

Figure 7:
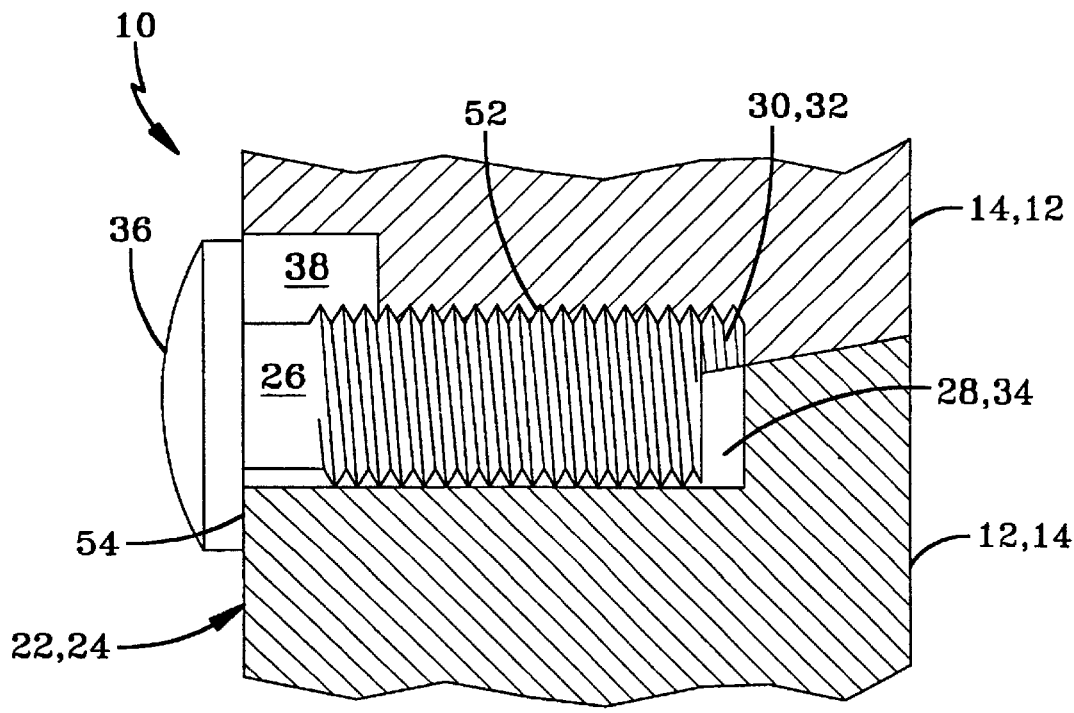
FIG. 7 is a detailed view of an embodiment of a hole used to separate the bushing 14 and the toothed wheel 12.

FIG. 7 represents an embodiment of a separation hole for either face 22, 24 of the assembly 10. The separation hole is formed by a bushing groove 30, 34 and a toothed wheel groove 28, 32 becoming aligned. One of the two grooves has a shoulder 54 adjacent the groove on the face 22, 24 of the assembly 10 for shouldering the head 36 of the threaded rod 26. The other groove has an open cavity 38 beginning at the face 22, 24 of the assembly 10 and extending partially along the groove. The second groove also has threads 52, to receive a threaded rod 26, located in the groove adjacent the cavity 38. When the threaded rod 26 with a bead 36 is shouldered against the shoulder 54 adjacent one of the grooves and in threaded connection with the threads 52 of the other groove and the threaded rod 26 is tightened, the head 36 of the threaded rod 26 will push on the shoulder 54 of one groove while travelling into the open cavity 38 of the other groove forcing the bushing 14 and the toothed wheel 12 to separate.

Figure 8:
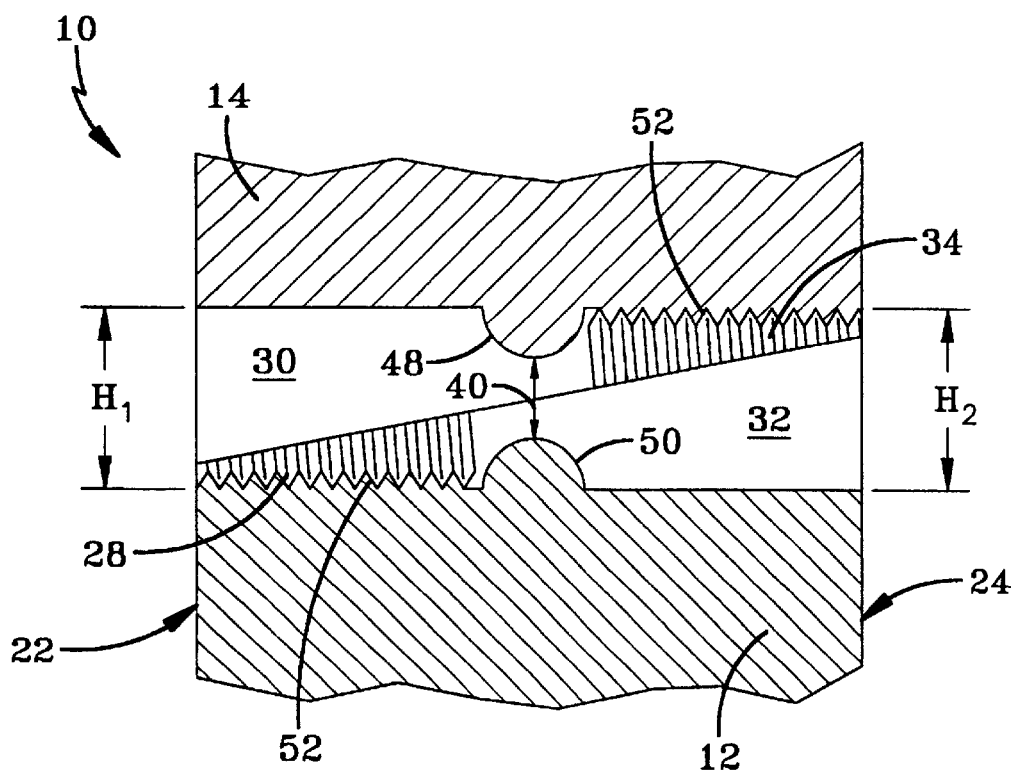
FIG. 8 shows an embodiment of the invention where the two sets of holes are interconnected by a passage 40 of smaller cross-sectional area than the interconnected holes.

FIG. 8 shows a detailed view of an embodiment of the invention where the first hole $H_1$ is interconnected to the second hole $H_2$ by a passage 40. The passage 40 has a smaller cross-sectional area than the intersected holes themselves. This passage 40 can be centered between the holes as shown or located nearer a groove surface which forms the holes. In one form, the passage 40 may be formed by a bore used to aid in drilling the interconnected holes.

What is claimed is:

1. An assembly (10) of a toothed wheel (12), a tapered bushing(14), and a threaded rod (26);

the toothed wheel (12), having a preferred direction of rotation about an axis, and having a tapered hole (16) forming at least one tapered surface (18) in the wheel (12) and forming a first opening ($W_1$) and a second opening ($W_2$), the first opening being larger than the second opening;

the tapered bushing (14) having a least one tapered surface (20), the tapered surface (20) being capable of a mating relationship with the wheel tapered surface (18);

the assembly (10) having a first face (22) and a second face (24) spaced apart from one another along an axis and when the tapered surfaces (18, 20) are in a mating relationship, the first opening ($W_1$) of the wheel tapered hole (16) is in proximity to the first face (22) of the assembly (10) and a second opening ($W_2$) of the wheel tapered hole (16) is in proximity to second face (24) of the assembly (10);

the assembly (10) having at least one first hole ($H_1$) for receiving the threaded rod (26), the hole ($H_1$) extending at least partially along the mating surfaces from the first face (22) of the assembly (10) toward the second face (24) of the assembly (10), the hole ($H_1$) being formed in part by a groove (28) located in the toothed wheel (12) and in part by a groove (30) located in the bushing (14) wherein the wheel groove (28) has a length as measured along the mating surfaces at least as great as the length of the bushing groove (30);

the assembly (10) being characterized by:

the assembly (10) having at least one second hole ($H_2$) for receiving the threaded rod (26), the hole ($H_2$) extending at least partially along the mating surfaces from the second face (24) of the assembly (10) toward the first face (22) of the assembly (10), the hole ($H_2$) being formed in part by a groove (32) located in the toothed wheel (12) and in part by a groove (34) located in the bushing (14), wherein the bushing groove (34) has a length as measured along the mating surfaces at least as great as the length of the wheel groove (32) and wherein the wheel groove (28) partially forming the first hole ($H_1$) and the bushing groove (34) partially forming the second hole ($H_2$) are identical in configuration and the bushing groove (30) partially forming the first hole ($H_1$) and the bushing groove (32) partially forming the second hole ($H_2$) are identical in configuration.

2. An assembly (10) as set forth in claim 1 wherein the wheel groove (28) partially forming the first hole ($H_1$) and the bushing groove (34) partially forming the second hole ($H_2$) have threads (52) for receiving a threaded rod (26).

3. An assembly (10) as set forth in claim 2, wherein the bushing groove (30) of the at least one first hole ($H_1$) terminates in a surface (48) to form the bushing groove as a blind half hole and the wheel groove (32) of the at least one second hole ($H_2$) terminates in a surface (50) to form the wheel groove (32) as a blind half hole.

4. An assembly (10) as set forth in claim 1 wherein the at least one first hole ($H_1$) is connected to the at least one second hole ($H_2$) by a passage (40) smaller in cross-sectional area than the interconnected holes ($H_1$, $H_2$).

5. An assembly (10) as set forth in claim 1 wherein the surfaces adjacent the grooves (28, 30) of the first hole ($H_1$) on the first face (22) include a shoulder (54) adjacent the bushing groove (30) formed by the bushing groove (30) and the surface of the bushing (14) and the wheel groove (28) has threads (52) and the surfaces adjacent the grooves (32, 34) of the second hole ($H_2$) on the second face (24) include a shoulder (54) adjacent the wheel groove (32) formed by the wheel groove (32) and the surface of the wheel (12) and the bushing groove (34) has threads (52).

6. An assembly (10) as set forth in claim 1 wherein the first face (22) of the assembly (10) has a separation hole formed from a groove in the toothed wheel (12) and a groove in the bushing (14) and the second face (24) of the assembly (10) has a separation hole formed from a groove in the toothed wheel (12) and a groove in the bushing (14).

7. An assembly (10) as set forth in claim 6 wherein one of the grooves partially forming one of the separation holes has an shoulder (54) adjacent to the groove and the other groove partially forming the separation hole is threaded and has a cavity (38) beginning at the face (22) or (24) of the assembly (10) and extending partially along the groove.

8. An assembly (10) as set forth in claim 6 wherein on the first face (22) of the assembly (10) has two first holes ($H_1$) and a separation hole and the second face (24) of the assembly (10) has two second holes ($H_2$) and a separation hole.

* * * * *